(12) United States Patent
Muchang et al.

(10) Patent No.: US 10,929,833 B2
(45) Date of Patent: Feb. 23, 2021

(54) WEARABLE PAYMENTS USING MULTIPLE MOUNTED DATA ELEMENTS

(71) Applicant: Visa International Service Association, San Francisco, CA (US)

(72) Inventors: Yobel Muchang, Dubai (AE); Christopher Dean, San Francisco, CA (US); Quan Wang, Foster City, CA (US); Mayank Somaiya, London (GB); Jerry Wald, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 245 days.

(21) Appl. No.: 15/936,735

(22) Filed: Mar. 27, 2018

(65) Prior Publication Data

US 2019/0303913 A1     Oct. 3, 2019

(51) Int. Cl.
| | |
|---|---|
| *G06Q 20/32* | (2012.01) |
| *G06Q 20/22* | (2012.01) |
| *G06K 19/07* | (2006.01) |
| *G06K 19/077* | (2006.01) |

(52) U.S. Cl.
CPC ..... *G06Q 20/3278* (2013.01); *G06K 19/0715* (2013.01); *G06K 19/07762* (2013.01); *G06Q 20/227* (2013.01)

(58) Field of Classification Search
CPC .......... G06N 20/00; H04L 67/10; H04W 4/80
See application file for complete search history.

(56) References Cited

U.S. PATENT DOCUMENTS

| | | | |
|---|---|---|---|
| 9,203,458 B2* | 12/2015 | Sutherland | H04B 1/3816 |
| 2012/0024947 A1* | 2/2012 | Naelon | G06Q 30/06 235/380 |
| 2015/0310412 A1 | 10/2015 | Calderon et al. | |
| 2015/0339696 A1 | 11/2015 | Zhou et al. | |
| 2015/0371215 A1 | 12/2015 | Zhou et al. | |

(Continued)

FOREIGN PATENT DOCUMENTS

| | | |
|---|---|---|
| CN | 104616148 A | 5/2015 |
| CN | 204496559 U | 7/2015 |
| GB | 2516861 A | 2/2015 |

OTHER PUBLICATIONS

J. J. Rutherford, "Wearable Technology," in IEEE Engineering in Medicine and Biology Magazine, vol. 29, No. 3, pp. 19-24, May-Jun. 2010, doi: 10.1109/MEMB.2010.936550. (Year: 2010).*

(Continued)

*Primary Examiner* — Hani M Kazimi
*Assistant Examiner* — John O Preston
(74) *Attorney, Agent, or Firm* — The Webb Law Firm

(57) ABSTRACT

Provided is a wearable device, including a base configured to be worn by a user, at least one data element at least partially positioned on or within the base and programmed or configured to have account data stored thereon, and at least one antenna including an open circuit, the at least one antenna at least partially positioned on or within the base and configured to transmit at least a portion of the account data and receive at least a portion of transaction data from at least one target device when the open circuit of the antenna is closed and becomes powered by at least one power source. Other expressions are also disclosed.

19 Claims, 11 Drawing Sheets

(56) References Cited

U.S. PATENT DOCUMENTS

2016/0110639 A1    4/2016  Finn et al.

OTHER PUBLICATIONS

European Journal of Business and Management. vol. 8, No. 8, 206. The Future of the Mobile Payment as Electronic Payment System. Zlatko Bezhovski, Krste Misirkov. (Year: 2016).*

A. E. Al-Chalabi, S. Essa, H. Shahzad and I. Damaj, "A wearable and ubiquitous NFC wallet," 2015 IEEE 28th Canadian Conference on Electrical and Computer Engineering (CCECE), Halifax, NS, 2015, pp. 152-157, doi: 10.1109/CCECE.2015.7129177. (Year: 2015).*

* cited by examiner

WEARABLE PAYMENTS USING MULTIPLE MOUNTED DATA ELEMENTS

BACKGROUND

1. Field

Provided are representative expressions of a wearable device that enables a wearer of the device to make payments using one of multiple data elements mounted in or in the wearable device.

2. Technical Considerations

To date, wearable payment devices largely focus on incorporating payment technology into watches and fitness bands. Recently, applications include footwear, rings, applique tattoos and other types of wearables (such as bracelets, broaches, necklaces, belts, and controllers). However, these typically require making a payment either from a single data element built into the device or from a single wallet programmed or configured in the wearable device with more than one stored account. When using more than one such data element, it may require replacing one data element with another.

SUMMARY

Accordingly, it is an object of the present disclosure to provide illustrative expressions of improved apparatus, systems, and methods for enabling payments from a wearable device worn by a user that overcome some or all of the deficiencies of the prior art.

According to a non-limiting expression, provided is a wearable device, comprising a base configured to be worn by a user; at least one data element at least partially positioned on or within the base and programmed or configured to have account data stored thereon; and at least one antenna comprising an open circuit, the at least one antenna at least partially positioned on or within the base and configured to transmit at least a portion of the account data and receive at least a portion of transaction data from at least one target device when the open circuit of the antenna is closed and becomes powered by at least one power source, wherein at least a portion of the base is configured to enable the at least one data element to make contact with the at least one antenna to cause the at least one data element to activate such that the at least one antenna transmits at least a portion of the account data stored on the at least one data element and receives at least a portion of transaction data from at least one target device when the at least one antenna is powered by at least one power source.

According to another non-limiting expression, provided is a wearable device wherein the at least one data element comprises at least one contact, and wherein the base comprises at least one guide arranged to guide movement of the at least one data element on or within the base to at least one region of the base to make contact between the at least one antenna and the at least one contact, thereby closing the open circuit of the at least one antenna.

According to another non-limiting expression, provided is a wearable device, wherein at least one data element is configured to be manipulated in the at least one region to make or break contact with the at least one antenna.

According to another non-limiting expression, provided is a wearable device, wherein the at least one antenna becomes activated when it makes contact with the at least one antenna and the at least one antenna becomes powered by the at least one power source and is deactivated when the contact is broken and/or it is otherwise not powered.

According to another non-limiting expression, provided is a wearable device further comprising at least one power system, the at least one power system comprising the at least one power source and a power controller configured to selectively power the at least one antenna with the at least one power source.

According to another non-limiting expression, provided is a wearable device wherein the at least one antenna comprises at least one of the following: an open loop, a braided loop, a coil, or any combination thereof.

According to another non-limiting expression, provided is a wearable device, comprising a base configured to be worn by a user; at least one data element at least partially positioned on or within the base and programmed or configured to store account data thereon; at least one antenna at least partially positioned on or within the base and configured to transmit at least a portion of the account data and receive at least a portion of transaction data from at least one target device when activated by at least one power source; and at least one switch element at least partially positioned on or within the base, wherein the at least one switch element is configured to enable the switch element to make contact with the at least one antenna and cause the at least one data element to activate and transmit at least a portion of the account data and receive at least a portion of transaction data from at least one target device when the at least one antenna becomes powered by at least one power source.

According to another non-limiting expression, provided is a wearable device, wherein at least one contact of the at least one data element and/or the at least one switch element may make contact with the at least one contact of the at least one antenna without having to be manipulated on the base to initiate, conduct, and/or effect a payment transaction.

According to another non-limiting expression, provided is a wearable device, wherein the at least one switch element comprises a clasping mechanism configured to clasp onto at least one portion of the base.

According to another non-limiting expression, provided is a wearable device, wherein the at least one switch element comprises at least one contact configured to make electrical contact with at least one contact of the at least one antenna to close an open circuit of the at least one antenna.

According to another non-limiting expression, provided is a wearable device, wherein at least one switch element may be in contact with the at least one contact of the at least one antenna without having to be manipulated.

According to another non-limiting expression, provided is a wearable device, further comprising at least one power system, the at least one power system comprising the at least one power source and a power controller configured to selectively power the at least one antenna with the at least one power source.

According to another non-limiting expression, provided is a wearable device, wherein in the at least one region in or on of the wearable device is in contact with the at least one antenna, the at least one antenna is within a wireless and/or passive range of at least one target device and powered either by a power system incorporated in the at least one data element and/or passively by the at least one target device thereby activating the at least one data element.

According to another non-limiting expression, provided is a wearable device, wherein the at least one antenna comprises at least one of the following: an open loop, a braided loop, a coil, or any combination thereof.

According to another non-limiting expression, provided is a wearable device comprising a base configured to be worn by a user; at least one data element at least partially positioned on or within the base and programmed or configured to store account data thereon; at least one antenna at least partially positioned on or within the base and configured to transmit at least a portion of the account data and receive at least a portion of transaction data from at least one target device data when activated by at least one power source; and at least one shielding element at least partially positioned on or within the base and/or the at least one data element, wherein the at least one shielding element is configured to selectively allow or prevent activation of the at least one data element.

According to another non-limiting expression, provided is a wearable device, wherein the at least one shielding element comprises an electrically non-conductive material or a material adapted to block wireless signals.

According to another non-limiting expression, provided is a wearable device, wherein the at least one shielding element is configured to be opened to permit a payment transaction to be initiated, conducted, and/or effected, or closed to prevent the payment transaction to be initiated, conducted, and/or effected.

According to another non-limiting expression, provided is a method of conducting and/or effectuating a payment transaction using a wearable device, comprising activating at least one antenna positioned on or within the wearable device when at least one data element and/or at least one switch element positioned on or within the wearable device to be in contact with the at least one antenna, the at least one antenna configured to transmit at least a portion of account data to and to receive at least a portion of transaction data from a target device when powered; transmitting, with the at least one antenna, the at least a portion of the account data to the at least one target device and receiving from the target device the at least a portion of the transaction data; and deactivating the at least one antenna when the payment transaction is either accepted or rejected.

According to another non-limiting expression, the at least one antenna is passively powered from the at least one target device.

According to another non-limiting expression, provided is a system further comprising at least one power system, the at least one power system comprising the at least one power source; and a power controller configured to selectively power the at least one antenna with the at least one power source.

Further preferred and non-limiting expressions or aspects are set forth in the following numbered clauses.

Clause 1: A wearable device, comprising a base configured to be worn by a user; at least one data element at least partially positioned on or within the base and programmed or configured to have account data stored thereon; and at least one antenna comprising an open circuit, the at least one antenna at least partially positioned on or within the base and configured to transmit at least a portion of the account data and receive at least a portion of transaction data from at least one target device when the open circuit of the antenna is closed and becomes powered by at least one power source, wherein at least a portion of the base is configured to enable the at least one data element to make contact with the at least one antenna to cause the at least one data element to activate such that the at least one antenna transmits at least a portion of the account data stored on the at least one data element and receives at least a portion of transaction data from at least one target device when the at least one antenna is powered by at least one power source.

Clause 2: The wearable device of clause 1, wherein the at least one data element comprises at least one contact, and wherein the base comprises at least one guide arranged to guide movement of the at least one data element on or within the base to at least one region of the base to make contact between the at least one antenna and the at least one contact, thereby closing the open circuit of the at least one antenna.

Clause 3: The wearable device of clauses 1 or 2, wherein the at least one data element is configured to be manipulated in the at least one region to make or break contact with the at least one antenna.

Clause 4: The wearable device of any of clauses 1-3, wherein the at least one antenna becomes activated when it makes contact with the at least one contact and the at least one antenna becomes powered by the at least one power source and is deactivated when the contact is broken and/or it is otherwise not powered.

Clause 5: The wearable device of any of clauses 1-4, further comprising at least one power system, the at least one power system comprising the at least one power source; and a power controller configured to selectively power the at least one antenna with the at least one power source.

Clause 6: The wearable device of any of clauses 1-5, wherein the at least one antenna comprises at least one of the following: an open loop, a braided loop, a coil, or any combination thereof.

Clause 7: A wearable device, comprising a base configured to be worn by a user; at least one data element at least partially positioned on or within the base and programmed or configured to store account data thereon; at least one antenna at least partially positioned on or within the base and configured to transmit at least a portion of the account data and receive at least a portion of transaction data from at least one target device when activated by at least one power source; and at least one switch element at least partially positioned on or within the base, wherein the at least one switch element is configured to enable the switch element to make contact with the at least one antenna and cause the at least one data element to activate and transmit at least a portion of the account data and receive at least a portion of transaction data from at least one target device when the at least one antenna becomes powered by at least one power source.

Clause 8: The wearable device of clause 7, wherein at least one contact of the at least one data element and/or the at least one switch element may make contact with the at least one contact of the at least one antenna without having to be manipulated on the base to initiate, conduct, and/or effect a payment transaction.

Clause 9: The wearable device of clauses 7 or 8, wherein the at least one switch element comprises a clasping mechanism configured to clasp onto at least a portion of the base.

Clause 10: The wearable device of any of clauses 7-9, wherein the at least one switch element comprises at least one contact configured to make electrical contact with at least one contact of the at least one antenna to close an open circuit of the at least one antenna.

Clause 11: The wearable device of any of clauses 7-10, wherein the at least one switch element is in contact with the at least one contact of the at least one antenna being manipulated.

Clause 12: The wearable device of any of clauses 7-11, further comprising at least one power system, the at least one power system comprising the at least one power source and a power controller configured to selectively power the at least one antenna with the at least one power source.

Clause 13: The wearable device of any of clauses 7-12, wherein at least one region in or on the wearable device is in contact with the at least one antenna, the at least one antenna is within a wireless and/or passive range of at least one target device and powered either by a power system incorporated in the at least one data element and/or passively by the at least one target device thereby activating the at least one data element.

Clause 14: The wearable device of any of clauses 7-13, wherein the at least one antenna comprises at least one of the following: an open loop, a braided loop, a coil, or any combination thereof.

Clause 15: A wearable device, comprising a base configured to be worn by a user; at least one data element at least partially positioned on or within the base and programmed or configured to store account data thereon; at least one antenna at least partially positioned on or within the base and configured to transmit at least a portion of the account data and receive at least a portion of transaction data from at least one target device when activated by at least one power source; and at least one shielding element at least partially positioned on or within the base and/or the at least one data element, wherein the at least one shielding element is configured to selectively allow or prevent activation of the at least one data element.

Clause 16: The wearable device of clause 15, wherein the at least one shielding element comprises an electrically non-conductive material or a material adapted to block wireless signals.

Clause 17: The wearable device of clauses 15 or 16, wherein the at least one shielding element is configured to be opened to permit a payment transaction to be initiated, conducted, and/or effected, or closed to prevent the payment transaction to be initiated, conducted, and/or effected.

Clause 18: A method of conducting and/or effectuating a payment transaction using a wearable device, comprising activating at least one antenna positioned on or within the wearable device when at least one data element and/or at least one switch element positioned on or within the wearable device to be in contact with the at least one antenna, the at least one antenna configured to transmit at least a portion of account data to and to receive at least a portion of transaction data from a target device when powered; transmitting, with the at least one antenna, the at least a portion of the account data to at least one target device and receiving from the target device the at least a portion of the transaction data; and deactivating the at least one antenna when the payment transaction is either accepted or rejected.

Clause 19: The method clause 18, wherein the at least one antenna is passively powered from the at least one target device.

Clause 20: The method of clauses 18 or 19, further comprising at least one power system, the at least one power system comprising at least one power source and a power controller configured to selectively power the at least one antenna with the at least one power source.

These and other features and characteristics of the present wearable devices, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

The drawings incorporated herein illustrate one or more expressions of the present wearable devices and methods and help to explain different aspects of the one or more expressions of the same. As such, the drawings are not to be viewed as limiting any one aspect of any expression of the wearable devices and methods. In the drawings.

DESCRIPTION OF THE PREFERRED EXPRESSIONS

Figure 1:
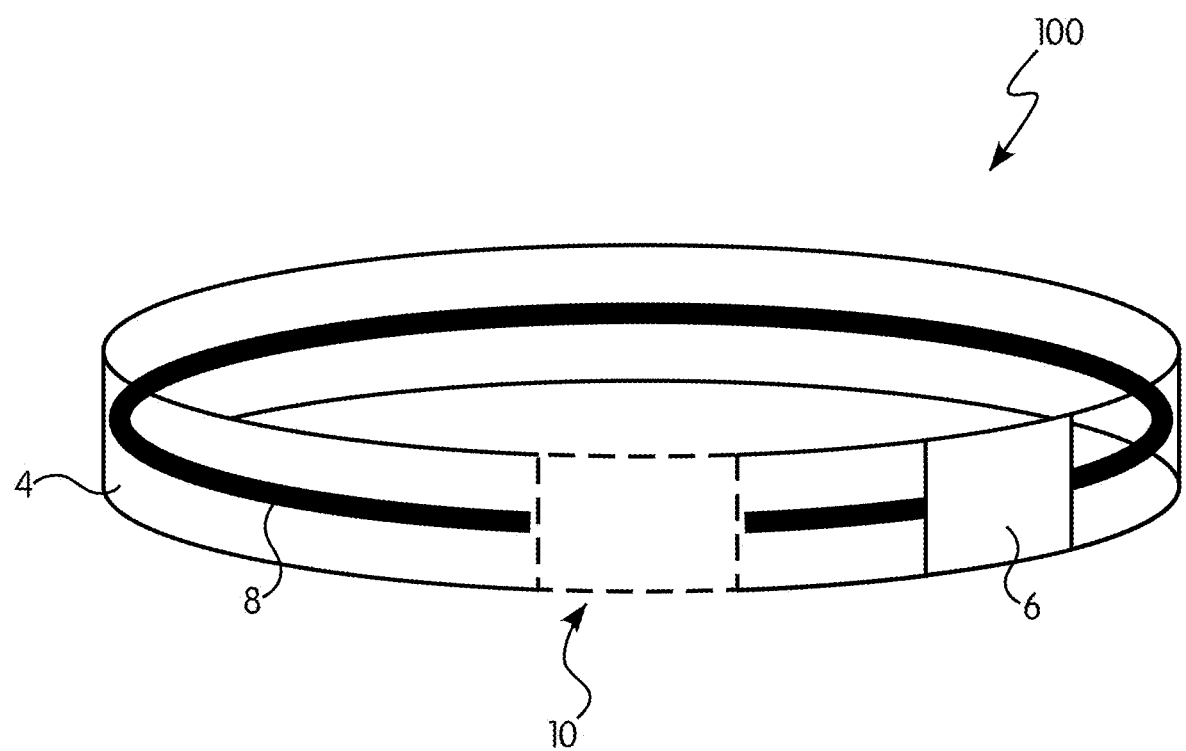
FIG. 1 is a schematic view of a non-limiting of expression or aspect of a wearable device according to the principles of the present invention.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the wearable device and methods and processes may assume various alternative variations and step sequences, except where expressly specified to the contrary. It is also to be understood that the specific devices and processes illustrated in the attached drawings, and described in the following specification, are simply exemplary expressions or aspects of the wearable devices and methods. Hence, specific dimensions and other physical characteristics related to the expressions or aspects disclosed herein are not limiting.

As used herein, the term "wearable device" is intended to mean any article or accessory that may be worn by a person or adorned or to be used on or in an article of clothing.

As used herein, the term "data element" refers to one or more devices that contain, incorporate, host, is, or includes a memory device, such as a chip, circuit, semiconductor, and/or other element that is programmed or configured to store at least a portion of account data for a user. A data element may be programmed or configured to initiate, conduct, and/or effect a payment transaction using any form of fiat or digital currency, including loyalty points, bitcoin, ethereum, and/or other like currencies and/or payment methods. In non-limiting expressions in which more than one data element is used for a wearable device, each data element may be programmed or configured to store account data from the same account or different accounts.

As used throughout this application the term "antenna" refers to one or more electrical components that may be used to receive and/or transmit account data and transaction data in an interaction with a target device.

As used throughout this application the term "target device" refers to one or more mobile devices, point-of-sale devices, and/or other merchant terminals capable of initiating, conducting, and/or effectuating a payment transaction. In some non-limiting expressions, a target device may be capable of providing power to a passively activated data element and/or interacting wirelessly with an activated data element.

As used herein, the term "contacts" refers to a component, region, or area of an antenna or data element designed to conduct power such that when they are used to close an open circuit of an antenna, a data element may be activated by a power source enabling it to initiate, conduct, and/or effect a payment transaction.

Representative, non-limiting expressions of the present wearable devices and methods are directed to improved wearable devices with multiple payment element capabilities. The improved wearable devices described herein do not require replacing data elements or storing multiple accounts on a single data element to achieve a wearable device with multiple payment element capabilities. Illustrative, non-limiting expressions of the present wearable devices and methods are directed to wearable devices comprising a base worn by a user, at least one stationary or manipulatable data element programmed or configured to store account data of at least one payment account, and at least one stationary or manipulatable antenna configured to transmit and receive account data and transaction data when the data element is activated and/or while interacting with at least one target device. In some non-limiting expressions, the wearable device may also comprise one or more stationary or manipulatable shielding elements to prevent the account data stored on the at least one data element from being transmitted by the at least one antenna or activated by an external device.

FIG. 1 is a schematic diagram and perspective view of a wearable device 100 according to one non-limiting expression or aspect. The wearable device 100 shown in FIG. 1 includes a representative complement of components configured to initiate, conduct, and/or effect a payment transaction. In this expression, the wearable device 100 includes a base 4, at least one data element 6, and at least one antenna 8. The antenna 8 has an open circuit including at least one region 10 on or within the base 4 that is configured to directly or indirectly complete the circuit to activate the data element 6 and/or provide power from at least one power source. The open circuit of the antenna may therefore be closed to initiate, conduct, and/or effect the payment transaction. In non-limiting expressions, the data element 6 is programmed or configured to store account data, at least a portion of which account data is transmitted to at least one target device (not shown). The wearable device 100, and particularly the antenna 8 and data element 6, may be configured to receive at least a portion of transaction data from the target device when activated by the power source.

With continued reference to FIG. 1, in some non-limiting expressions, the data element 6 may be positioned on or within the base. For example, the data element may be positioned on an inside surface of the base 4, on an outside surface of the base 4, and/or embedded within a channel in the base 4. In non-limiting expressions, the data element 6 may be manipulated along the base 4 such that the data element 6 can be moved to the region 10 on or within the base 4 to complete the circuit of the antenna 8. The data element 6 may be manipulated by moving, configuring, arranging, and/or positioning the data element.

Figure 2:
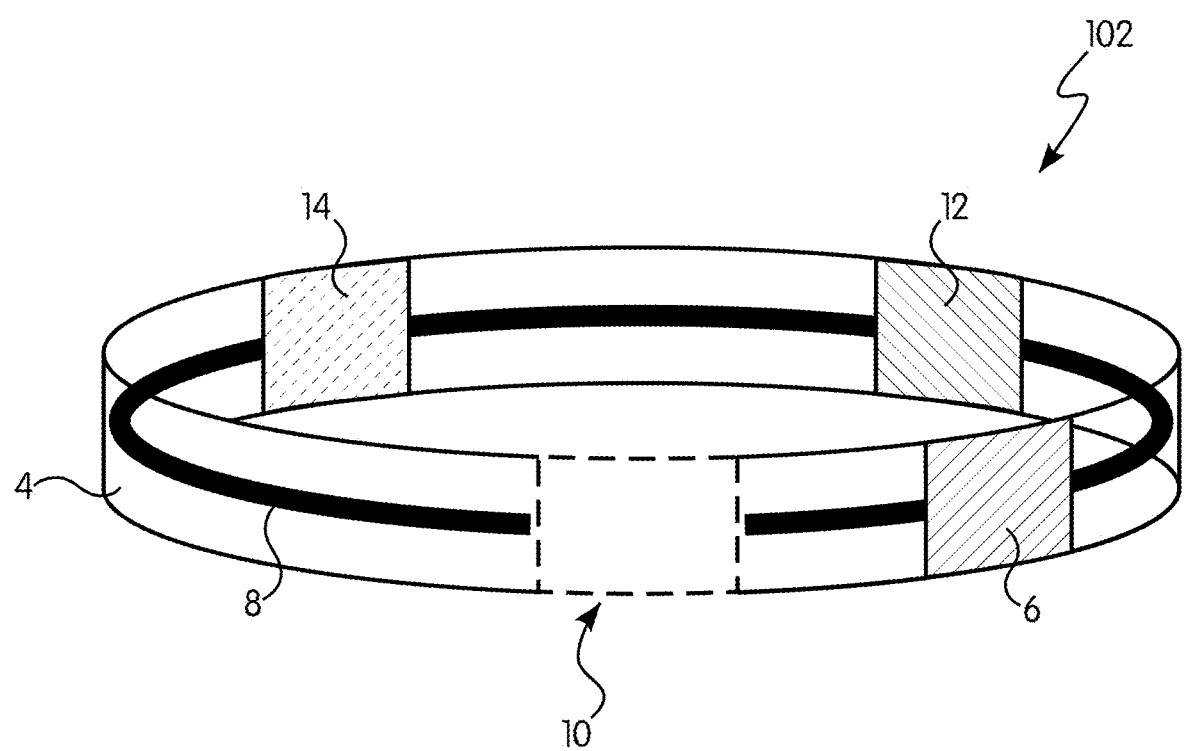
FIG. 2 is a schematic, perspective view of a non-limiting expression or aspect of a wearable device according to the principles of the present invention.

FIG. 2 shows a schematic diagram and perspective view of a wearable device 102 according to a non-limiting expression or aspect. According to this non-limiting expression, the wearable device 102 comprises a base 4 which provides a structural foundation on or in which at least one data element 6 may be mounted and manipulated and in which an antenna 8 may be positioned and/or integrated. A structural aspect of the base 4 includes a region 10 into which, or within which, the data element 6 may be manipulated. The wearable device 102 shown in FIG. 2 includes multiple data elements 6, 12, 14. Each data element 6, 12, 14 may include the same or different data. For example, in some non-limiting expressions, each data element 6, 12, 14 corresponds to a different account associated with a user and stores account data associated with such accounts. Each of the plurality of data elements 6, 12, 14 may be independently and/or separately mounted and positioned along the base 4. Any number of data elements 6, 12, 14 may be used that can fit within the dimensions (e.g., length, width, height, or area) of the base 4 and the dimensions (e.g., length, width, height, or area) of the data elements. It will be appreciated that various other arrangements are possible.

Figure 3:
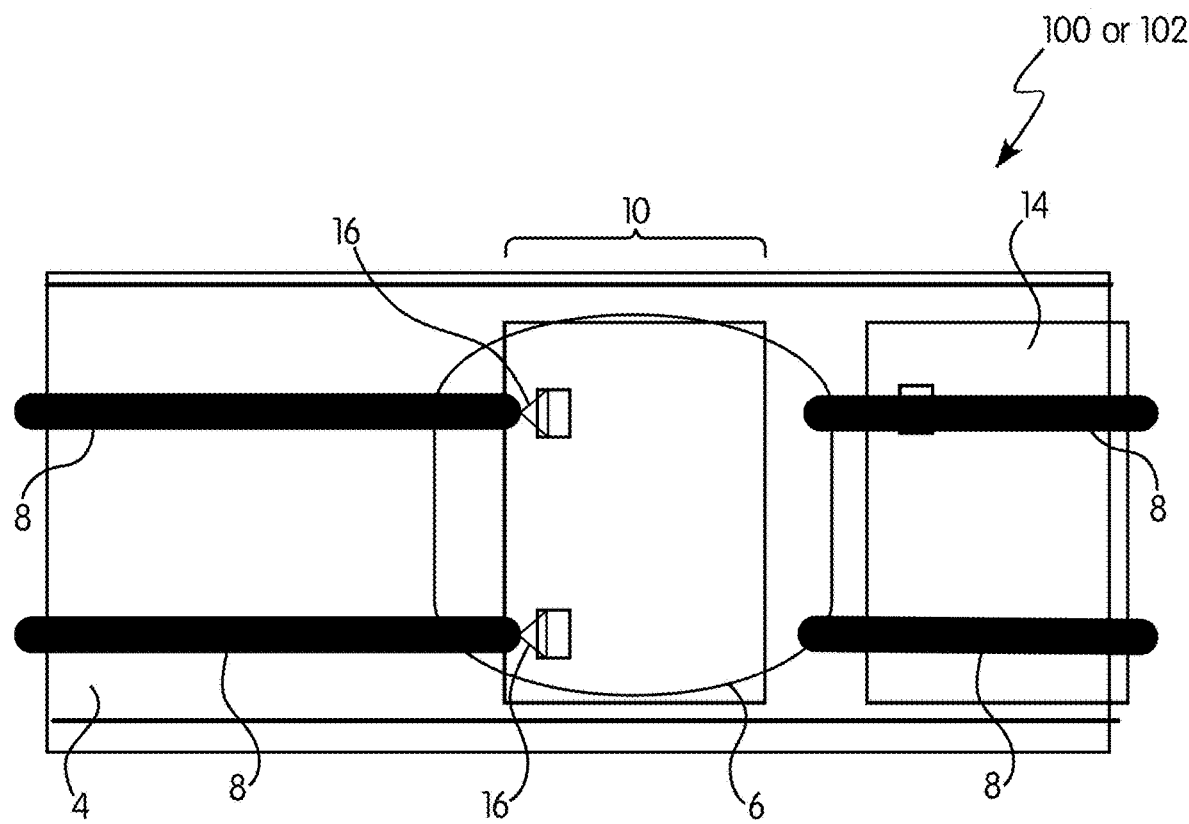
FIG. 3 is schematic, top-down view of a non-limiting expression or aspect of a wearable device according to the principles of the present invention.
Figure 4:
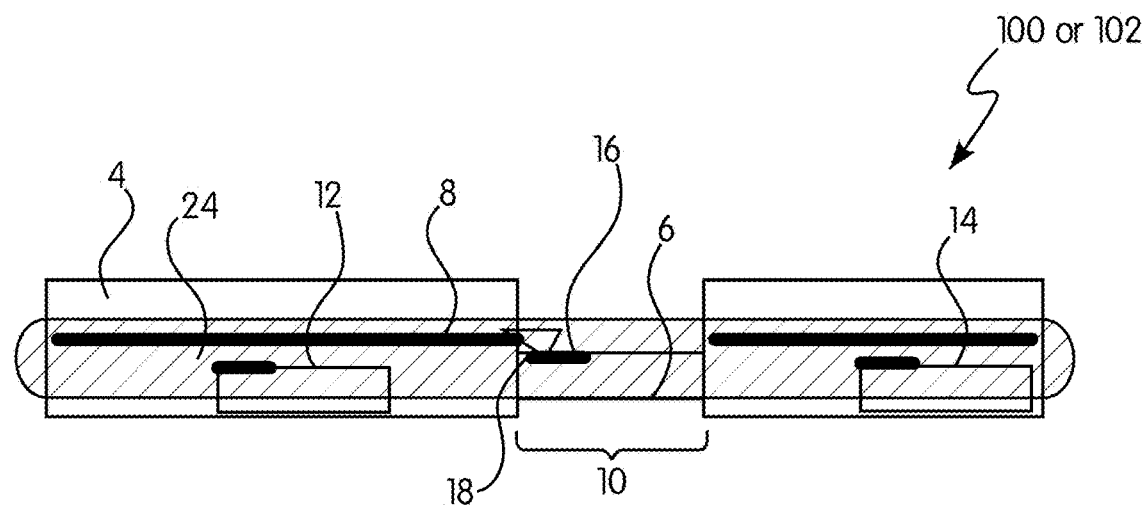
FIG. 4 is a schematic, longitudinal view of a non-limiting expression or aspect of a wearable device according to the principles of the present invention.

FIGS. 3 and 4 depict a schematic diagram and top and side views, respectively, of the base 4 of the wearable device 100, 102 according to a non-limiting expression or aspect. At least one antenna 8 is positioned on or within the base 4. The antenna 8 is in the form of an open circuit and is configured with one or more electrical contacts 16 on the open end of the circuit. The electrical contacts 16 of the antenna 8 may be configured to establish an electric connection with one or more electrical contacts 18 positioned on the data element 6. Accordingly, the data element 6 may be manipulated to or within a region 10 on the base 4 to establish electrical communication between one or more electrical contacts 16 on the antenna 8 and one or more electrical contacts 18 on the data element 6, thereby closing the circuit of the antenna 8 and allowing it to transmit and receive data when powered by a power source.

With continued reference to FIGS. 3 and 4, the data element 6 may also include circuitry for establishing an electrical connection between the electrical contacts 18 of the data element 6. The base 4 shown in FIG. 3 also includes another data element 14. As shown in FIG. 3, the data element 6 is positioned in a region 10 on the base 4. The data element 14 is positioned remotely from the region 10 and is configured to be manipulated into or within the region 10. Because the data element 14 does not complete the antenna 8 circuit, the data element 14 remains deactivated and unable to transmit account data to or receive transaction data from the target device and is, therefore, unable initiate, conduct, and/or effect a payment transaction. The base 4 shown in FIG. 4 includes three data elements 6, 12, 14, where only one data element 6 is activated.

When the antenna circuit closes and becomes powered in the presence of a target device (not shown), the data element 6 becomes activated and is thereby enabled to initiate, conduct, and/or effect a payment transaction by allowing an interaction to occur between the antenna 8 and the target device. The interaction allows the activated data element 6 to transmit at least a portion of the account data stored thereon to the target device and to receive at least a portion of transaction data from the target device.

FIG. 4 further illustrates how the data elements 6, 12, 14 may be installed on or in the base 4 according to one non-limiting expression or aspect. For example, the data elements 6, 12, 14 may be fitted into or onto one or more guides 24 which run the length of the base 4 in alignment with the antenna 8. The one or more guides 24 permit the data elements 6, 12, 14 to be manipulated to or within the region 10. The guide 24 may include a track and/or a rail that engages a corresponding track and/or rail on the data elements 6, 12, 14. FIG. 4 illustrates the data element 6 in the region 10 has been manipulated so that its contact 18 is in electrical contact with the contact 16 of the antenna 8 while a comparable set of contacts on the data element 12 do not.

In the non-limiting expression shown in FIG. 4, the data element 6 is in a raised position in the region 10 relative to data elements 12, 14. The raising of the data element 6 within the base 4 brings the contact(s) 18 of the data element 6 into electrical contact with the contact 16 of the antenna 8. In this position the circuit of the antenna 8 closes and the data element 6 may be activated to initiate, conduct, and/or effect a payment transaction when powered by a power source (not shown). In this configuration, the plurality of data elements 12, 14 remains unable to initiate, conduct, and/or effect a payment transaction in so far as they are not in contact with the contact(s) 16 of the antenna 8 and, thereby, remain deactivated. Similarly, lowering the data element 6 once it conducts and/or effects a payment transaction, deactivates the data element 6 insofar as raising it breaks the contact between the contact(s) 18 and the contact(s) 16 of the antenna 8.

Figure 5:
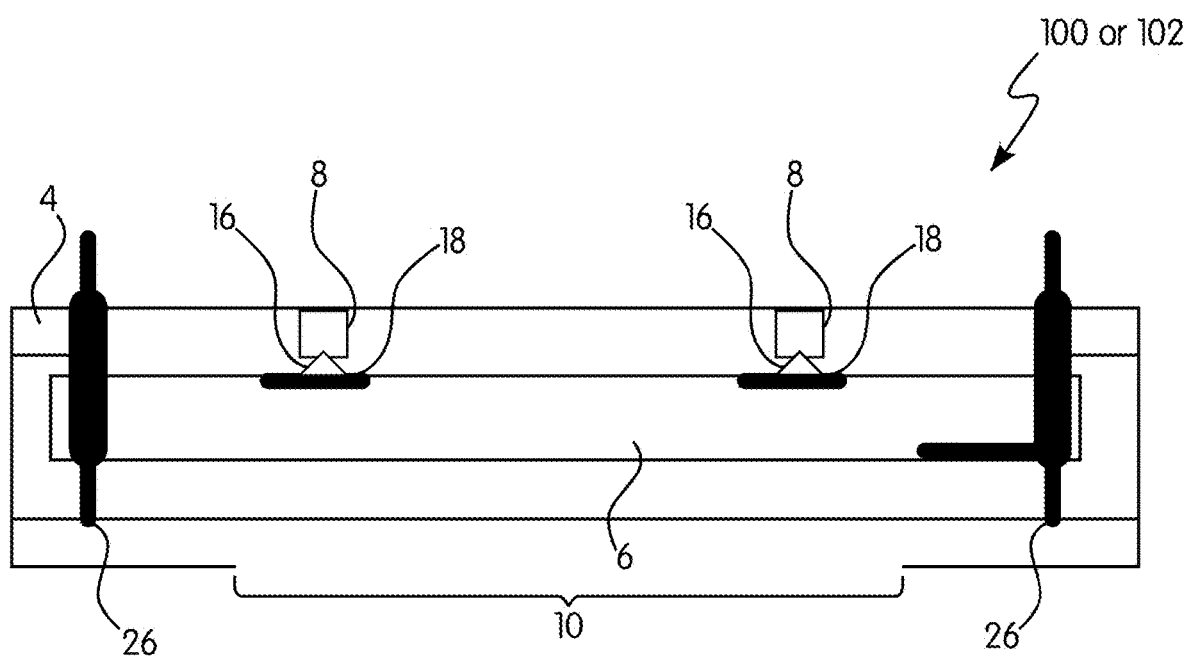
FIG. 5 is a schematic, cross-sectional view of a non-limiting expression or aspect of a wearable device according to the principles of the present invention.

FIG. 5 shows a schematic diagram and cross-sectional view of the base 4 of the wearable devices 100, 102 according to a non-limiting expression or aspect. FIG. 5 illustrates at least one detent 26 in the data element. The detent 26 permits the data element 6 to be raised and lowered with respect to the at least one guide. The raising and lowering of the data element 6 either brings the contact(s) 16 of the antenna 8 into electrical contact with the contact(s) 18 of the data element 6 or breaks an already-established electrical contact, depending on the manipulation used. In the arrangement of the data element 6 on the base 4, raising the data element 6 closes the circuit of the antenna, which when powered and in appropriate proximity of the target device (not shown), activates the data element 6 and enables the data element 6 to initiate, conduct, and/or effect a payment transaction. Conversely, if the data element 6 is lowered after a payment transaction is completed, the lowering of the data element 6 may break the circuit, deactivating the data element 6 and thereby preventing a second payment transaction until it is again manipulated to do so.

Although the detent 26 may be raised to activate the data element 6 and/or close the circuit of the antenna 8, and lowered to deactivate the data element 6 and/or open the circuit of the antenna 8, it will be appreciated that the detent 26 may be lowered to activate the data element 6 and raised to deactivate the data element 6. Those of skill in the art appreciate that other variations are possible.

In other non-limiting expressions, the detent 26 provides a security measure for the wearable devices 100, 102. It permits the data element 6 to be lowered after initiating, conducting, and/or effectuating a payment transaction to break the previously closed electrical circuit of the antenna 8, thereby deactivating the data element 6. In this configuration, if the wearable devices 100, 102 are placed within proximity of the target device (not shown) and capable of activating the data element 6, a payment transaction cannot be inadvertently initiated, conducted, and/or effected.

Figure 6:
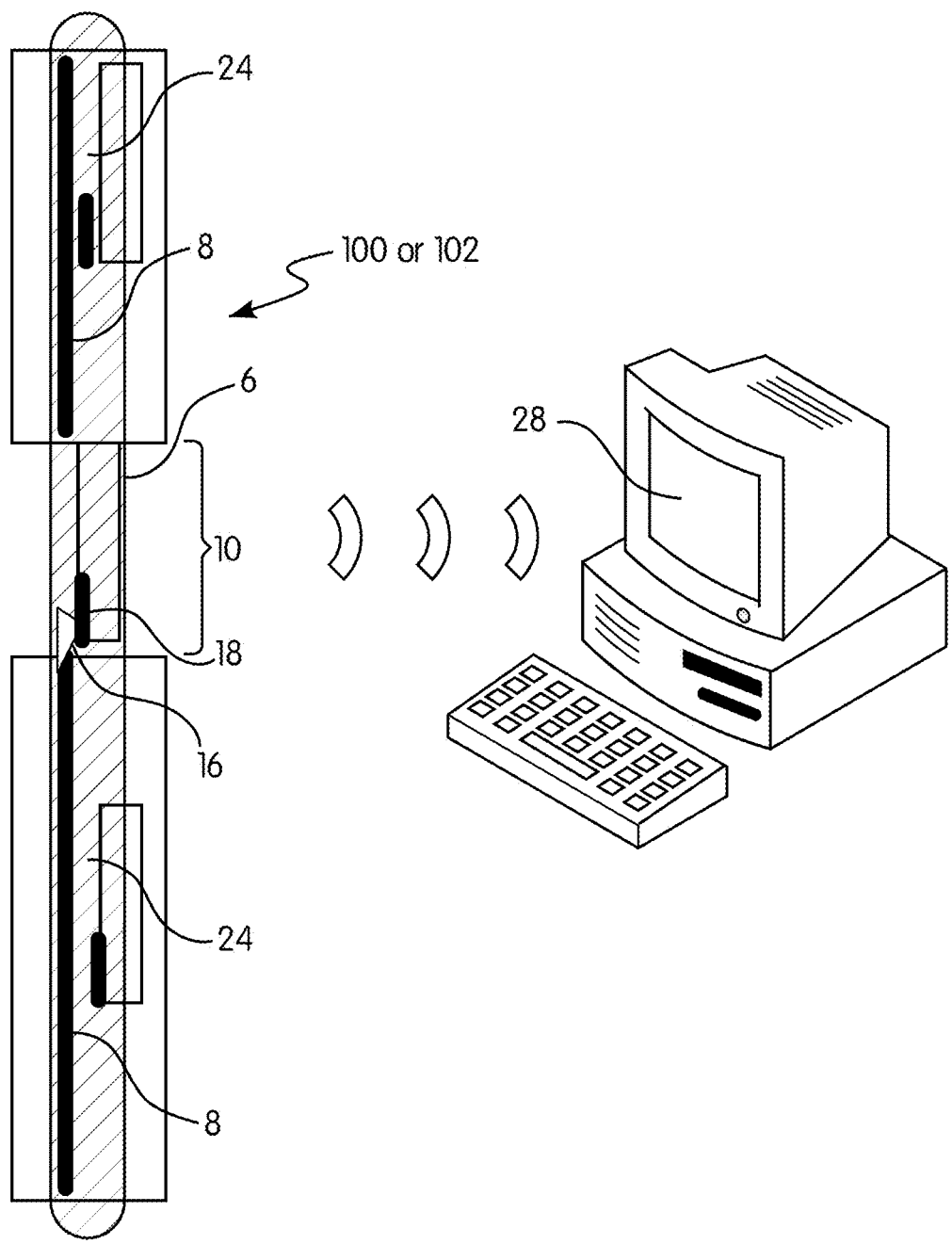
FIG. 6 is a schematic, perspective view of a non-limiting expression or aspect of a wearable device in wireless communication with a non-limiting representation of a target device according to the principles of the present invention.

FIG. 6 shows a schematic diagram of the wearable devices 100, 102 according to a non-limiting expression or aspect. The target device 28 in FIG. 6 includes a power system capable of wirelessly and/or passively powering one or more data elements of the wearable devices 100, 102 when the wearable devices 100, 102 are positioned within a wireless and/or passive power range wherein it may receive such power. When the wearable device 100 or 102 is positioned within the wireless and/or passive power range of the target device 28, and the data element 6 is manipulated to be in a region 10 to close the open circuit of the antenna 8, the antenna 8 becomes passively powered by the power system. After the transmission and reception of at least a portion of account and transaction data, the payment transaction will either be approved or declined.

Figure 7:
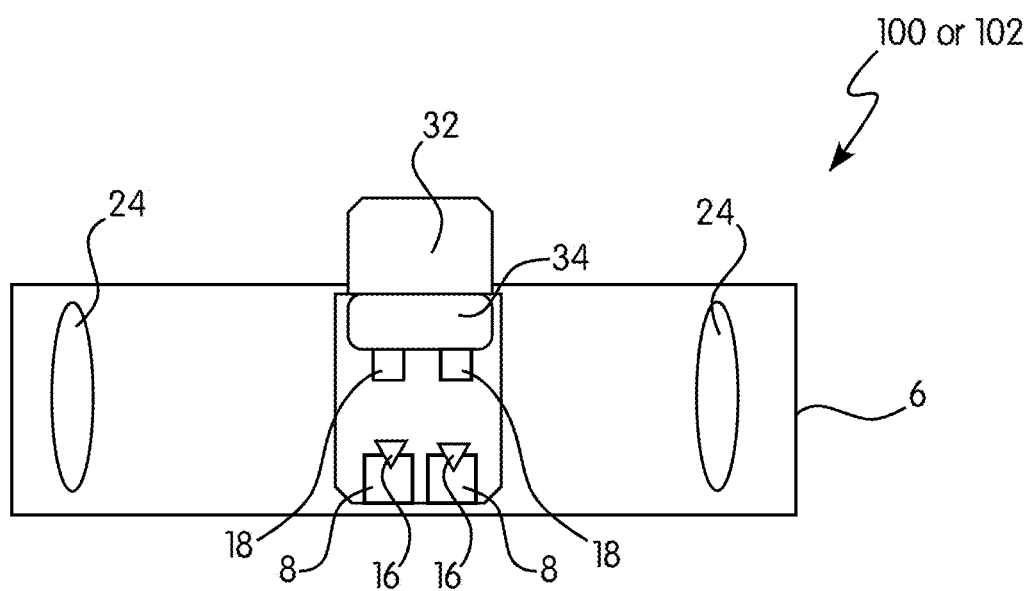
FIG. 7 is a schematic, cross-sectional view of a non-limiting expression or aspect of a power system according to the principles of the present invention.

While the antenna of a wearable device may be configured to be passively powered and the data element 6 activated, as illustrated in FIG. 6, in other non-limiting expressions the antenna may be powered and the data element activated through other methods. For example, as shown in the schematic diagram and cross-sectional view of the data element 6 in FIG. 7, the data element 6 includes a power system including an on/off controller 32 (e.g., a button or switch) coupled to a stand-alone power source 34 (e.g., a battery or the like). When the on/off controller 32 is placed in an "on" position (for example, by pressing it), the power source 34 provides power to the data element 6 and the antenna 8, activating the data element 6 to initiate, conduct, and/or effect a payment transaction when within the wireless range of the target device (not shown). Placing the on/off controller 32 in an "off" position (for example, by depressing it) inhibits the power source 34 from providing power by, for example, breaking electrical contact between the data element 6 and the antenna 8, thereby deactivating the data element 6 and preventing it from transmitting account data to or receiving transaction data from the target device until the on/off controller 32 is placed in an "on" position again.

The antenna of the wearable devices 100, 102 may take many forms. Illustrative non-limiting expressions or aspects of the antenna are shown in FIG. 3, FIG. 4, FIGS. 8A-B, and FIG. 9. The antenna may be a single wire loop on or in the base of the wearable device, a loop that ends at a region 10 along the base, as shown by antenna 8 in FIG. 1 and FIG. 2. Alternatively, the antenna may be configured as at least one set of braided wires 50, as depicted by the non-limiting expression shown in FIG. 8A. The antenna may also be configured as least one set of coils 52 arranged on a data element 6, as depicted in the non-limiting expression shown in FIG. 8B, which may be integrated with a power system including a power source 34, as depicted by the non-limiting expression shown in FIG. 9. Those of skill in the art appreciate that the antenna may be any form or type suitable for use with the wearable devices described herein.

Figure 8A:
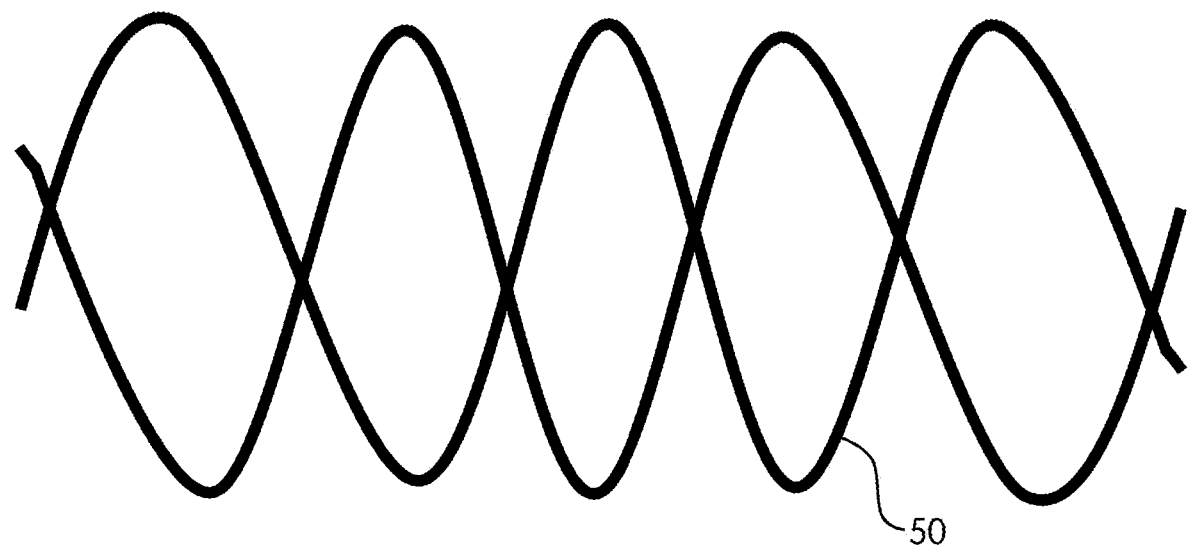
FIGS. 8A-B exemplify non-limiting expressions or aspects of antenna configurations in accordance with the principles of the present invention.
Figure 8B:
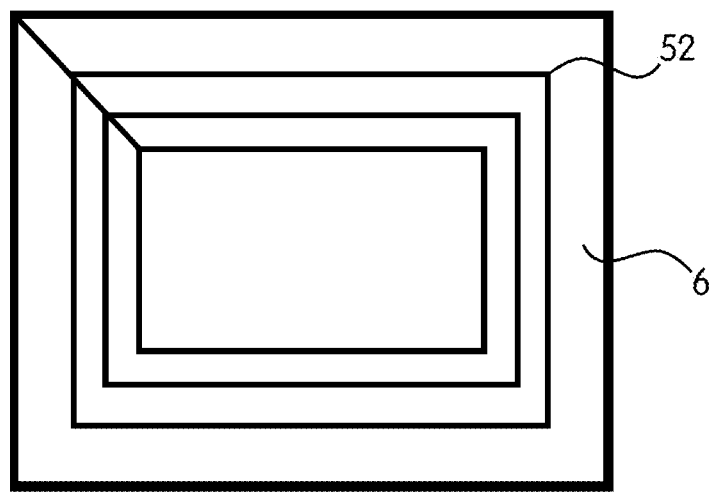
Figure 9:
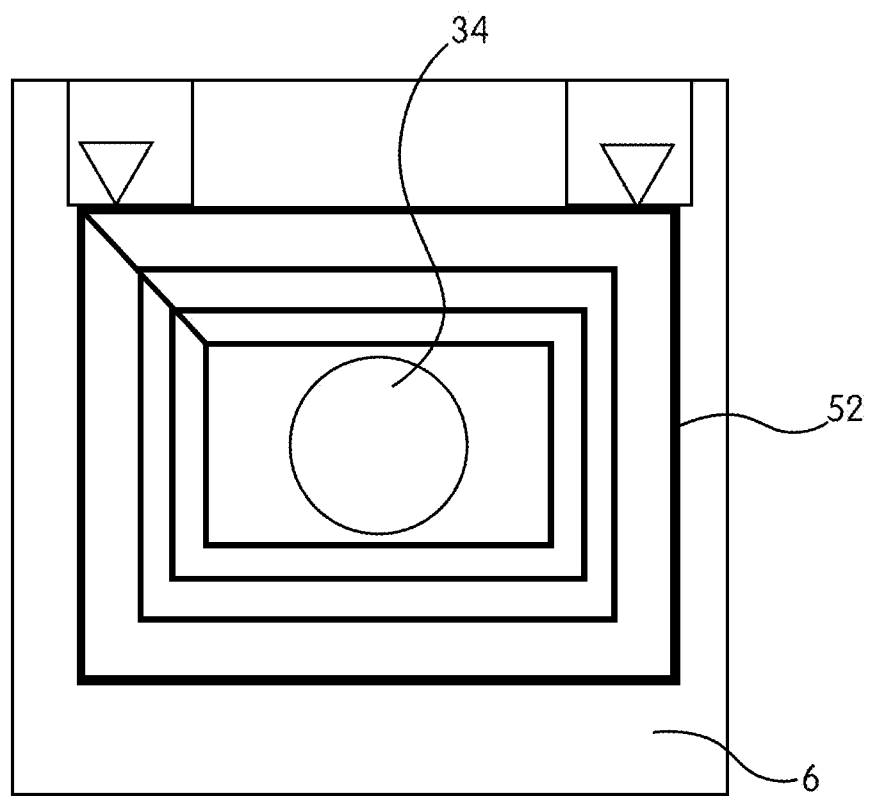
FIG. 9 is a schematic view of a non-limiting expression or aspect of an antenna configuration in accordance with the principles of the present invention.

In non-limiting expressions or aspects, a switch element may be positioned on or within the base of the wearable device. The switch element may be arranged to make electrical contact with the antenna to close the open loop of the antenna, thereby allowing the antenna to transmit account data stored on the data element when the data element is activated by a power source. For example, if the coil antenna illustrated in FIGS. 8A-B and FIG. 9 is on a switch element without a power system (FIGS. 8A-B) or with a power system (FIG. 9), the switch element may be used to close a circuit of the at least one antenna.

The switch element may be used in various combinations with the plurality of data elements. For example, the switch element may replace one of the data elements of a plurality of data elements on a wearable device in non-limiting expressions or aspects in which the wearable device comprises at least two data elements.

Alternatively, the switch element may be positioned at the region 10 on the base 4 of the wearable devices 100, 102. For example, the switch element and a structural element positioned on the region 10 may be designed as two parts of a clasp mechanism such that the switch element can be mechanically coupled to the region 10 of the base. The switch element may clasp onto, for example, a portion of the base having a structural lip, gap, groove, or protrusion. In this manner, the switch element may lock, latch, and/or attach to the region 10 of the base 4 of the wearable devices 100, 102.

When the switch element is used in non-limiting expressions or aspects, the base 4 of the wearable devices 100, 102 may be designed so that any of the data elements may be raised and/or lowered using the structural elements previously described. In such non-limiting expressions, the antenna may have at least one contact 16 at each of the data element positions, and each of the data elements may have at least one contact 18 such that if the contact(s) 18 is lowered it makes contact with the contact(s) 16 of the antenna, closing the antenna circuit. When the circuit is closed and the antenna powered, a data element may become activated or conversely it may be deactivated if it is raised, thereby opening the circuit.

When the switch element is used as one of at least two parts of a clasp mechanism, the antenna of a wireless device may be powered either wirelessly and/or passively or by the power system of the type illustrated in FIGS. 8A-B that is integrated into the data element. Alternatively, the clasp may itself integrate the integrated power system of the type illustrated in FIGS. 8A-B. In such non-limiting expressions, the clasp may be used to activate the data element which does not have the integrated power system in lieu of the data element being activated by the antenna being powered either wirelessly and/or passively.

A wearable device that uses a switch element to close the circuit of the antenna and in which the data element is in contact with the antenna when the circuit is closed, conducts or effects a payment transaction in the presence of the target device when the antenna becomes either wirelessly and/or passively powered by the target device or powered by a power system that has been incorporated into either the data element or the switch element. At such times, the data element becomes activated, wherein it transmits to the target device at least a portion of the account data and receives from the target device at least a portion of transaction data. On these bases, the payment transaction may be either accepted or rejected.

Figure 10:
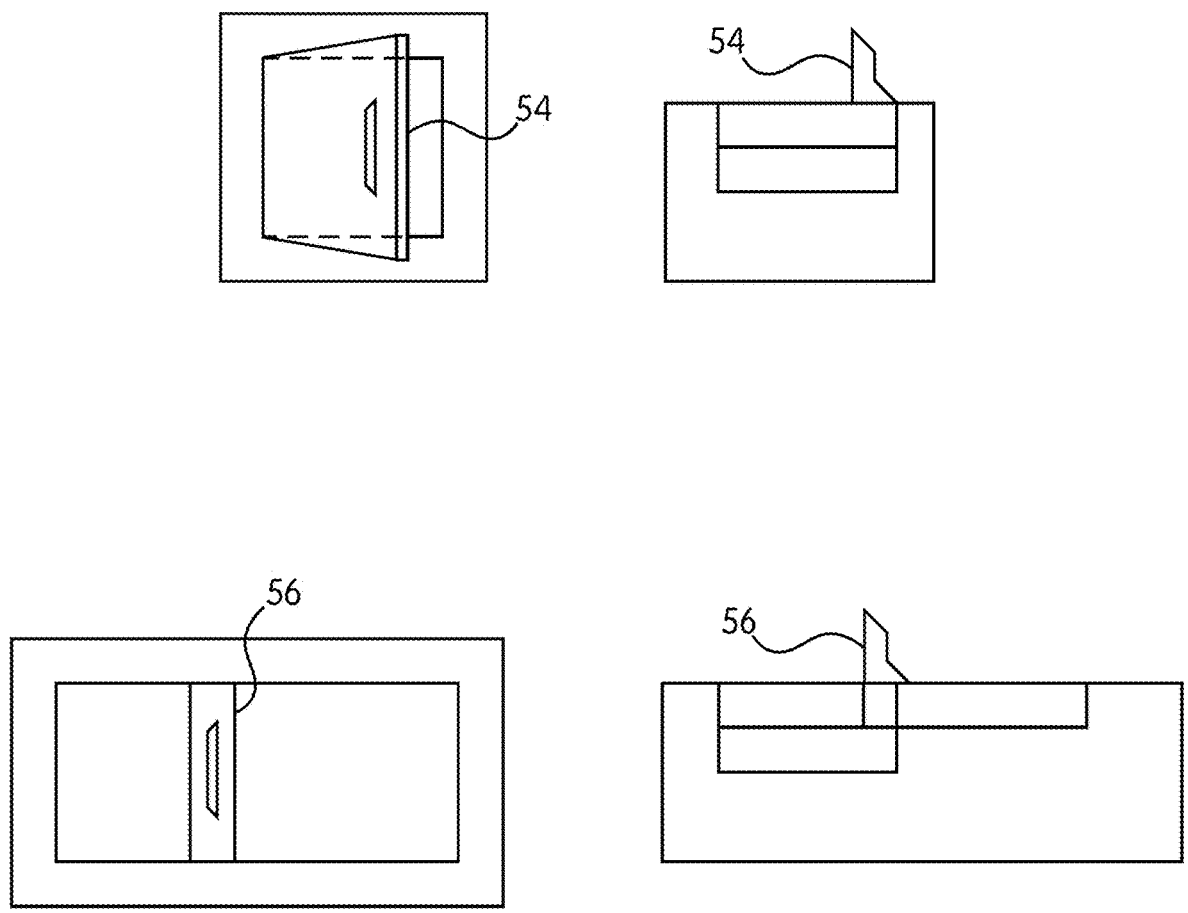
FIG. 10 is a schematic, perspective view of non-limiting expressions of manipulatable shielding in accordance with the principles of the present invention.

FIG. 10 depicts a schematic, perspective view of alternative configurations of the data element and/or the switch element according to a non-limiting expression or aspect, including configurations incorporating a built-in "door" or "window" shielding element comprised of an electrical and wireless non-conductive/transmissive material. In some non-limiting expressions or aspects, a base of the wearable device may also include such a shielding element. Using a data element and/or switch element configuration with a shielding element in a wearable device allows a data element and/or a switch element to be permanently in contact with the antenna of a wearable device. As illustrated in non-limiting expressions or aspects shown in FIG. 10, the built-in door 54 may be raised, or the built-in window 56 slid open, to expose the data element and/or the switch element to a target device to enable a payment transaction to be conducted or effected as operationally described above when the data element is in contact with the antenna, the antenna is powered, and the wearable device is within the wireless and/or passive power range of the target device.

Figure 11:
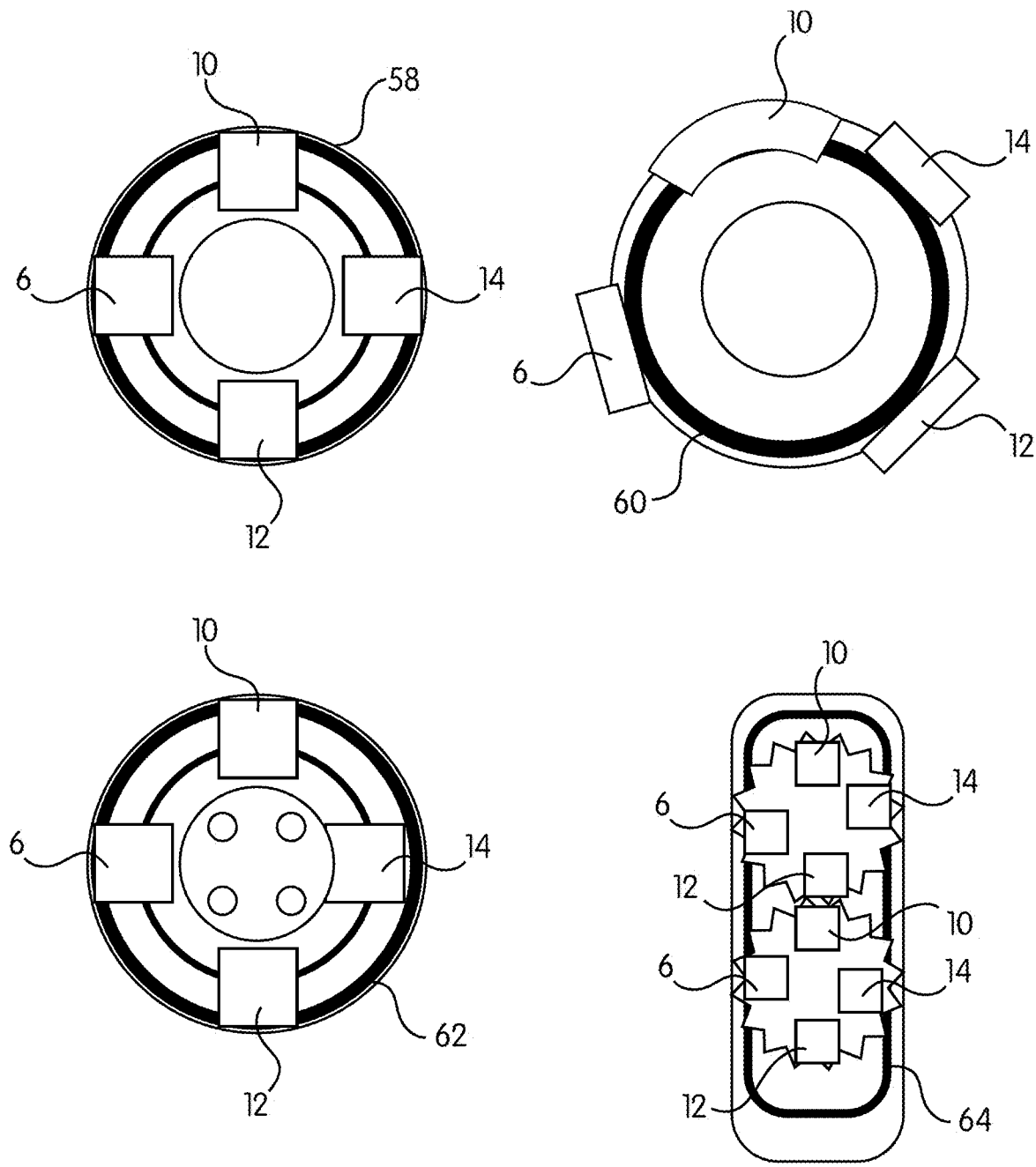
FIG. 11 exemplifies schematics of alternate non-limiting wearable device expressions in accordance with the principles of the present invention.

FIG. 11 illustrates non-limiting schematic perspective views of non-limiting expressions or aspects of several alternate wearable device designs. The wearable devices may incorporate the described components, structural elements, configurations, and operations described herein to initiate, conduct and/or effect a payment transaction. Shown in FIG. 11 are non-limiting expressions and aspects for a broach 58, a ring 60 with data elements arrayed around its surface, a button 62, and a ring 64 with data elements housed in meshing gears on the top of the ring. The broach 58, rings 60, 64, and button 62 each include data elements 6, 12, 14 and region 10. For simplicity of illustration, the data element and antenna contacts are not shown, but are assumed incorporated. Note that illustrated guides and antennas expressions of the variety of wearable bases may be continuous if their at least one data element and/or at least one switch element integrates a power system of the type previously described or when the at least one antenna may be wirelessly and/or passively powered. In either case, a payment transaction will not occur until the at least one data element contacts the at least one antenna and becomes activated within wireless and/or passive power range needed to interact with the at least one target device.

Figure 12:
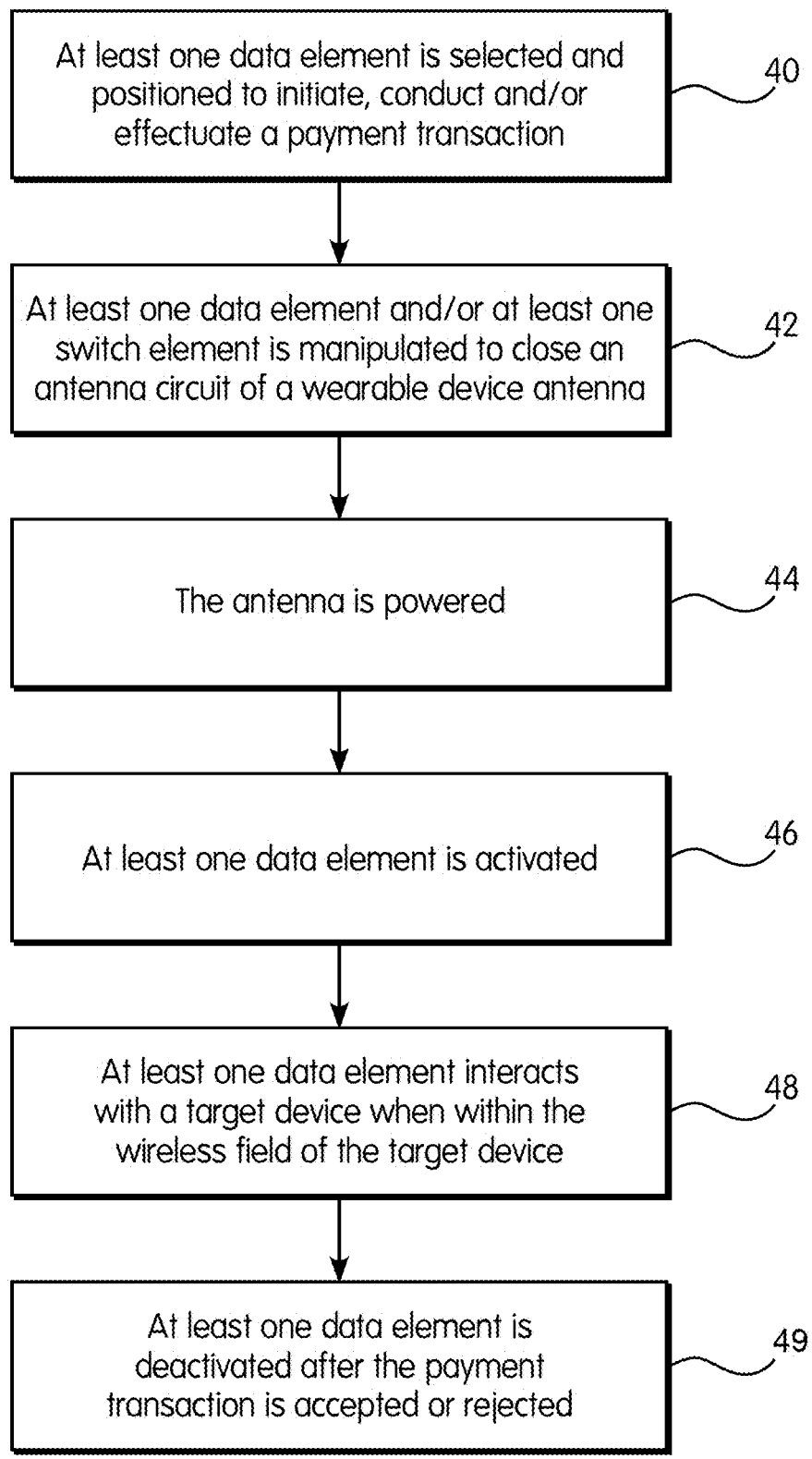
FIG. 12 is a non-limiting representation of the process used to enable and initiate, conduct, and/or effect a transaction according to the principles of the present invention.

Finally, a non-limiting flow diagram for a method by which a payment transaction payment may be conducted or effected by a wearable device appears in FIG. 12. As described in step 40, at least one data element is selected to initiate, conduct, and/or effect a payment transaction. The at least one data element and/or at least one switch element is manipulated in step 42 to close an antenna circuit on the wearable device. In step 44, the antenna is powered by a power system, which may either be a passive power system of a target device or a power system integrated in the at least one data element or the at least one switch. Once the antenna is powered, the at least one data element is activated, although in some wearable devices this may require that a shield be moved or opened to enable the at least one data element to interact with the target device. In step 46, the at least one data element may be selected to initiate, conduct, and/or effect the payment transaction after being activated by the powered antenna. Once activated and within the range of the wireless range of the target device, step 48 illustrates that the at least one data element interacts with the target device and, in particular, transmits at least a portion of account data from account data programmed or configured on the at least one data element to the target device and receives at least a portion of the transaction data from the target device. The payment transaction is either accepted or rejected, and step 49 shows the deactivation of the at least one data element and/or switch element.

Although the present wearable devices and methods have been described in detail for the purpose of illustration based on what is currently considered to be the most practical and preferred expressions, it is to be understood that such detail is solely for that purpose and that the wearable devices and methods are not limited to the disclosed expressions, but, on the contrary, are intended to cover modifications and equivalent arrangements that are within the spirit and scope of the appended claims. It is understood that the present wearable devices and methods contemplate that, to the extent possible, one or more features of any expression can be combined with one or more features of any other expression.

The invention claimed is:

1. A wearable device, comprising:
   a base configured to be worn by a user;
   at least one data element at least partially positioned on or within the base and programmed or configured to have account data stored thereon, wherein the at least one data element comprises at least one contact; and
   at least one antenna comprising an open circuit, the at least one antenna at least partially positioned on or within the base and configured to transmit at least a portion of the account data and receive at least a portion of transaction data from at least one target device when the open circuit of the antenna is closed and becomes powered by at least one power source, wherein at least a portion of the base is configured to enable the at least one data element to make contact with the at least one antenna to cause the at least one data element to activate such that the at least one antenna transmits at least a portion of the account data stored on the at least one data element and receives at least a portion of transaction data from at least one target device when the at least one antenna is powered by at least one power source, and wherein the at least one data element is configured to be manipulated to make contact between the at least one contact and the at least one antenna to close the open circuit.

2. The wearable device of claim 1, wherein the base comprises at least one guide arranged to guide movement of the at least one data element on or within the base to at least one region of the base to make contact between the at least one antenna and the at least one contact.

3. The wearable device of claim 2, wherein the at least one antenna becomes activated when it makes contact with the at least one contact and the at least one antenna becomes powered by the at least one power source and is deactivated when the contact is broken and/or it is otherwise not powered.

4. The wearable device of claim 1, further comprising at least one power system, the at least one power system comprising:
   the at least one power source; and
   a power controller configured to selectively power the at least one antenna with the at least one power source.

5. The wearable device of claim 1, wherein the at least one antenna comprises at least one of the following: an open loop, a braided loop, a coil, or any combination thereof.

6. The wearable device of claim 1, wherein the at least one data element comprises at least two data elements, and wherein each data element of the at least two data elements is configured with different account data.

7. A wearable device, comprising:
   a base configured to be worn by a user;
   at least one data element at least partially positioned on or within the base and programmed or configured to store account data thereon;
   at least one antenna at least partially positioned on or within the base and configured to transmit at least a portion of the account data and receive at least a portion of transaction data from at least one target device when activated by at least one power source; and
   at least one switch element at least partially positioned on or within the base, wherein the at least one switch element is configured to be manipulated to make contact between the at least one data element and the at least one antenna to cause the at least one data element to activate and transmit at least a portion of the account data and receive at least a portion of transaction data from at least one target device when the at least one antenna becomes powered by at least one power source.

8. The wearable device of claim 7, wherein at least one contact of the at least one data element and/or the at least one switch element may make contact with the at least one contact of the at least one antenna without having to be manipulated on the base to initiate, conduct, and/or effect a payment transaction.

9. The wearable device of claim 7, wherein the at least one switch element comprises a clasping mechanism configured to clasp onto at least a portion of the base.

10. The wearable device of claim 7, wherein the at least one switch element comprises at least one contact configured to make electrical contact with at least one contact of the at least one antenna to close an open circuit of the at least one antenna.

11. The wearable device of claim 7, wherein the at least one switch element is in contact with the at least one contact of the at least one antenna without being manipulated.

12. The wearable device of claim 7, further comprising at least one power system, the at least one power system comprising:
   the at least one power source; and
   a power controller configured to selectively power the at least one antenna with the at least one power source.

13. The wearable device of claim 7, wherein in at least one region in or on the wearable device is in contact with the at least one antenna, the at least one antenna is within a wireless and/or passive range of at least one target device and powered either by a power system incorporated in the at least one data element and/or passively by the at least one target device thereby activating the at least one data element.

14. The wearable device of claim 7, wherein the at least one antenna comprises at least one of the following: an open loop, a braided loop, a coil, or any combination thereof.

15. The wearable device of claim 7, wherein the at least one data element comprises at least two data elements, and wherein each data element of the at least two data elements is configured with different account data.

16. A wearable device, comprising:
   a base configured to be worn by a user;
   at least one data element at least partially positioned on or within the base and programmed or configured to store account data thereon, the at least one data element comprising at least one contact;
   at least one antenna at least partially positioned on or within the base and configured to transmit at least a portion of the account data and receive at least a portion of transaction data from at least one target device when activated by at least one power source; and at least one shielding element at least partially positioned on or within the base and/or the at least one data element, wherein the at least one shielding element is configured to selectively allow or prevent activation of the at least one data element.

17. The wearable device of claim 16, wherein the at least one shielding element comprises an electrically non-conductive material or a material adapted to block wireless signals.

18. The wearable device of claim 16, wherein the at least one shielding element is configured to be opened to permit a payment transaction to be initiated, conducted, and/or effected, or closed to prevent the payment transaction to be initiated, conducted, and/or effected.

19. A method of conducting and/or effecting a payment transaction using a wearable device, comprising:

activating at least one antenna positioned on or within a wearable device in response to at least one data element or at least one switch element, or any combination thereof, being manipulated into a position on or within the wearable device to be in contact with the at least one antenna, the at least one antenna configured to transmit at least a portion of account data to and to receive at least a portion of transaction data from a target device when powered;

transmitting, with the at least one antenna, the at least a portion of the account data to at least one target device and receiving from the target device the at least a portion of the transaction data; and deactivating the at least one antenna when the payment transaction is either accepted or rejected.

* * * * *